United States Patent [19]

Herve

[11] Patent Number: 4,620,829

[45] Date of Patent: Nov. 4, 1986

[54] DEVICE FOR COUNTER-BALANCING THE FORCES DUE TO GRAVITY IN A ROBOT ARM

[75] Inventor: Jacques M. Herve, Pommeuse, France

[73] Assignee: Ecole Centrale Des Arts et Manufactures, Paris, FranceX

[21] Appl. No.: 737,082

[22] Filed: May 23, 1985

[30] Foreign Application Priority Data

May 29, 1984 [FR] France ............................. 84 08383

[51] Int. Cl.$^4$ ............................................. B66C 23/72
[52] U.S. Cl. ...................................... 414/720; 901/48
[58] Field of Search ............................. 414/719, 720; 248/292.1, 280.1; 901/48

[56] References Cited

U.S. PATENT DOCUMENTS 4,080,530  3/1978  Krogsrud ................. 248/280.1 X
4,280,783  7/1981  Hayward ..................... 414/720 X

FOREIGN PATENT DOCUMENTS 1209308  10/1970  United Kingdom ............... 414/720
1396684   6/1975  United Kingdom ............... 414/719

Primary Examiner—Robert J. Spar
Assistant Examiner—D. Glenn Dayoan
Attorney, Agent, or Firm—Cushman, Darby & Cushman

[57] ABSTRACT

The counter-balancing device incorporates a rigid auxiliary component hinged about a second horizontal axis parallel to the rotation axis of the robot arm. This auxiliary component incorporates two transverse arms whose distal ends are capable of bearing against a portion of a component which is movable in translation and is subjected to a return force proportional to the distance between an initial position and the position instantaneously occupied by this component. The rigid auxiliary component is driven in rotation about the second axis at an angular velocity whose modulus is equal to half that of the robot arm; the assembly is calibrated angularly in such a way that when the arm is vertical, the two distal ends of the transverse arms bear simultaneously upon the said straight portion, the constant of proportionality between (a) a return force and (b) the amplitude of displacement and the distance from the second axis to the distal ends of the transverse arms being chosen in such a way that balancing is obtained.

10 Claims, 1 Drawing Figure

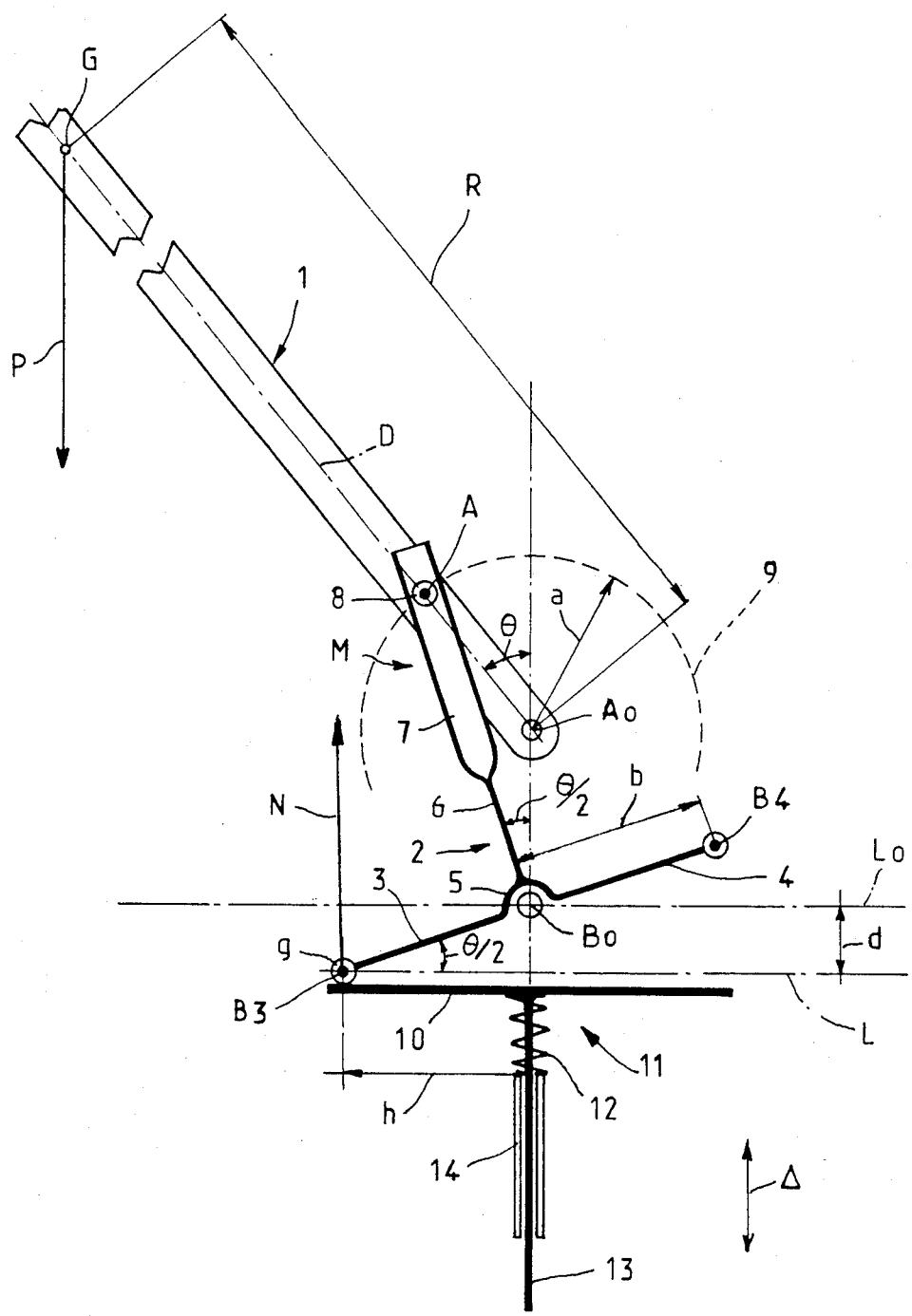

DEVICE FOR COUNTER-BALANCING THE FORCES DUE TO GRAVITY IN A ROBOT ARM

FIELD OF THE INVENTION

The invention concerns a device for counter-balancing the gravitational force on a robot arm or similar structure, hinged for rotation about a horizontal axis.

When a robot arm is not balanced in relation to gravity, the motors or actuators driving this arm must overcome the torques created by the force gravity. On the other hand, if the arm is counter-balanced in relation to gravity, the energy of the motors or actuators driving the arm may be entirely devoted to overcoming inertia and friction, and sometimes also magnetic resistance.

Consequently, robot arms which are currently being constructed are generally equipped with a counter-balancing system.

However, the counter-balancing systems proposed until the present time are approximate.

OBJECTS OF THE INVENTION

It is an overall aim of the invention to provide a device for balancing the gravitational force on a robot arm so as to enable strictly correct counter-balancing to be obtained with the possibility of a large angular swing of the arm.

It is a further object to provide a counter-balancing device which does not cause any significant dynamic interference phenomena.

SUMMARY OF THE INVENTION

According to the invention, a device for counter-balancing the gravity forces on a robot arm or similar structure, hinged for rotation about a horizontal axis, is characterised in that it incorporates:

an auxiliary rigid component hinged about a second horizontal axis parallel to that of the robot arm, this auxiliary component incorporating two transverse arms extending on each side of the second axis, the distal ends of these two transverse arms being symmetrical relative to this second axis and forming a straight line which intersects the second axis, these distal ends also being capable of bearing against a straight portion of a component which is movable in translation and is biased back towards an initial position, said biased force being proportional to the distance between the initial position and the position occupied by the said translationally movable component;

means for driving the said rigid auxiliary component in rotation about the second axis at an angular velocity whose modulus is equal to half that of the robot arm;

the assembly being calibrated angularly in such a way that (a), when the robot arm is vertical, the two distal ends of the transverse arms bear simultaneously upon said straight portion which occupies said initial position, the translationally movable component not then being subjected to any return force, and (b) the constant of proportionality between the return force and the amplitude of displacement of the translationally movable component, and the distance from the second axis to the distal ends of the transverse arms, are chosen in such a way that balancing is ensured.

If P represents the sum of the vertical gravitational forces on the robot arm, and if R represents the distance between the centre of action of these gravitational forces on the robot arm and the axis of rotation of the robot arm, counter-balancing is achieved when K and b are chosen in such a way that the relation $\frac{1}{4} Kb^2 = PR$ is satisfied.

Generally, said translationally movable component is guided by a rectilinearly translatable mechanism along a direction which intersects said second horizontal axis and which is at right angles to this second axis. The straight portion, against which the distal ends of the transverse arms bear, is at right angles to the direction of translation. The translationally movable component preferably has an axis of symmetry which is parallel to its direction of translation. The direction of translation of the movable component is advantageously the vertical direction.

The means of exerting the return force of the component which is movable in translation incorporate at least one spring of constant stiffness.

Each distal end of the transverse arms may be provided with a roller, or similar device, which is capable of rolling against said straight portion of the translationally movable component.

The means for driving said rigid auxiliary component in rotation at an angular velocity equal to half that of the robot arm, may incorporate a mechanism forming an isosceles triangle with one of its two equal sides joining the axis of rotation of the robot arm to said second horizontal axis of rotation (of the rigid auxiliary component) and whose other equal side joins the axis of rotation of the robot arm to the hinge of a pivoting slide of variable length, the other end of this slide being hinged on the said second horizontal axis of rotation (of the rigid auxiliary component).

The second axis of rotation (of the rigid auxiliary component) may be situated in a vertical plane passing through the first mentioned axis of rotation (of the robot arm) and in particular may be situated below this first mentioned axis.

The translationally movable component may consist of a component essentially having the shape of a T whose transverse branch corresponds to said straight portion against which the distal ends of the transverse arms bear.

BRIEF DESCRIPTION OF THE DRAWINGS

Apart from the features described above, the invention incorporates certain other objects and advantages which are described in greater detail below in relation to a particular embodiment, with reference to the accompanying drawing, the embodiment not being limiting in any way.

The single FIGURE in this drawing shows a diagrammatic elevation of a device in accordance with the invention for counter-balancing the gravitational force on a robot arm.

DESCRIPTION OF THE PREFERRED EMBODIMENT

Referring now to the drawing, there can be seen a device for counter-balancing the forces due to gravity in robot arms incorporating hinges for rotation about horizontal axes. The invention will be described for a single robot arm 1 pivoting about a single horizontal axis Ao. However, the invention also relates to arms hinged about several axes which remain horizontal.

Before describing the invention itself, it will be useful to give the following information:

Ao represents the projection, on the plane of the FIGURE, of the horizontal pivoting axis of the robot arm 1 to be counter-balanced.

$\theta$ represents the angle of deviation of the main direction D of the arm 1 relative to the upward vertical. This main direction passes through Ao and through a point G which is the centre of action of the gravitational force upon arm 1. The point G may either be the centre of gravity of the arm 1, or a point more distant from Ao than the centre of gravity, corresponding to the equilibrium of the weight of the arm and of forces transmitted to the axis by contact at a possible further articulation. It may be shown that the point G is a fixed point on the arm 1 when the further hinged arm sections not being considered are themselves counter-balanced.

If R represents the distance Ao-G and if P represents the sum of the vertical gravitational forces upon the arm 1, at G, shown by an arrow, the moment about Ao of the gravity forces on the arm 1 is given by the mathematical expression:

PR sin $\theta$, sin $\theta$ being the sine of the angle $\theta$ of inclination of the arm Ao-G relative to the upward vertical.

The counter-balancing device according to the invention is arranged to exert permanently upon the robot arm 1 about axis Ao, a rotational moment of the same amplitude but in the opposite direction to that created by the gravitational forces.

The counter-balancing device incorporates a rigid auxiliary component 2 hinged about a second horizontal axis Bo, shown by its projection on the plane of the FIGURE. This axis Bo is parellel to the first axis Ao and is held fixed relative there. In the embodiment shown in the drawing, the axis Bo is in the same vertical plane as the axis Ao, and below Ao. However, the axis Bo if desired may be situated at any point outside the vertical plane passing through the axis Ao.

The auxiliary component 2 incorporates two transverse arms 3, 4 extending to each side of the second axis Bo. The distal ends B3, B4 of these two transverse arms form a straight line which intersects the second axis, Bo, the ends B3, B4 being symmetrical relative to this second axis Bo. Preferably the arms 3 and 4 are straight and are aligned along the straight line joining the distal ends B3, B4; this straight line is at right angles to the axis Bo; a hinge bearing 5, shown diagrammatically, is provided at the junction of the arms 3 and 4 so that they may be rotatably mounted upon the axis Bo. Each distal end B3, B4 may be equipped with a rotatable roller g.

Means M are provided for driving the auxiliary component 2 for rotation about the second axis Bo at an angular velocity $\omega$ equal to half of the angular velocity of the robot arm 1 about the axis Ao. This will thus give the relation $\omega = \frac{1}{2}\Omega$, as an absolute value. The auxiliary component 2 may rotate in the same direction as, or in the opposite direction from, the robot arm 1.

The driving means M may consist of a mechanical connection relating the rotation of the arm 1 about axis Ao to that of the auxiliary component 2 about axis Bo. Such mechanical connection may consist of a mechanism involving a chain, belt, or other inextensible flexible device, or of a mechanism with gear wheels or of an articulation mechanism.

In the drawing, the driving means M incorporate a hinged mechanism forming an isosceles triangle A, Ao, Bo. The two equal sides of this isosceles triangle are firstly AAo and secondly AoBo, both of length a. Consequently the angle which AAo makes with the vertical will always be twice that which ABo makes with the vertical, and the angular velocities are in the same ratio. The third side ABo has a variable length. The rigid auxiliary component 2 has essentially the shape of a T whose transverse branch is formed by the assembly of the arms 3 and 4 and whose stem 6 is directed upwards. This stem 6 is provided with a longitudinal housing 7 slidably receiving a peg 8 carried by the arm 1, the centre of the peg 8 corresponding to the point A situated on the straight line D. This peg is firmly fixed to the arm 1 and can orbit with it during rotation of the arm 1 about the axis Ao; the trajectory of the centre A is formed by the circular arc 9, of radius a shown in dotted line form in the drawing.

The distal ends B3, B4 of the component 2 are capable of bearing against a straight portion 10 of a component 11 which is movable in translation, and is subjected to an upward biasing force returning the component 11 towards an initial position in which the distal ends B3, B4 are situated on the chain-dotted horizontal line Lo. In the position shown in the drawing, the component 11 is distant from its initial position and the end B3 which alone bears against the straight portion 10 is situated on the line L, which is parallel to Lo and is situated at a distance d from Lo. In practice, the biasing force to which the movable component 11 is subjected is proportional to distance d.

This biasing force is provided by a system incorporating at least one elastic spring 12, with a stiffness constant K. The spring 12 is shown diagrammatically in the drawing by a helical compression spring. In place of such a compression spring, a tension spring could advantageously be provided (which could be arranged differently without the need for buckling preventing guidance).

The component 11 may have the shape of a T. The straight portion 10, formed by the transverse branch of the T is horizontal and at right angles to the stem 13 of this T which is directed downwards and is vertical.

It is guided by a straight line translation mechanism, for example a slide 14 in which the stem 13 is engaged. The direction $\Delta$ of translation of the component 11 is parallel to the direction of the stem 13, that is to say it is vertical.

It should be noted that the straight portion 10 or cross bar of the T may be inclined to the horizontal and that the direction of translation may be other than vertical.

The movable component 11 forms a kind of plate. The straight portion 10 may be formed by a bar or by a plate, particularly with a rectangular or a circular profile. Thus the expression "straight portion" should be understood as describing a portion which is projected along a straight line in the plane of the FIGURE of the drawing.

The return force exerted by the spring or springs 12 upon the component 11 and transmitted to the component 2 tends to bring the point A vertically above the axis Ao, that is to say this return action opposes that of the forces due to gravity acting at the point G and shown symbolically by the arrow P.

The movable component 11 preferably has an axis of symmetry parallel to the direction of translation, this axis consisting, in the example shown, of the axis of the stem 13.

The assembly is calibrated angularly in such a way that when the robot arm 1 is vertical, the two distal ends B3, B4 of the transverse arms, which are situated on the line Lo, bear simultaneously against the straight portion 10 which occupies the initial position and which is not then subjected to any upward return force.

The constant of proportionality K, and the distance b of the second axis Bo from the distal end B3 or B4 of the transverse arms, are chosen so that the expression:

$$\tfrac{1}{4}Kb^2 = PR$$

is satisfied in order to ensure counter-balancing, P being the sum of the gravitational forces on the robot arm 1, and R being the distance between the centre of action G and the axis of rotation Ao.

The operation of the counter-balancing device is as follows:

When the arm 1 is inclined at an angle $\theta$ relative to the upward vertical, the auxiliary component 2 is inclined relative to its initial position at an angle $\theta/2$ either in the same direction or in the opposite direction, depending upon the transmission mechanism adopted. Under the action of one of the ends, for example B3 as shown in the drawing, the movable component 11 is displaced by a distance d relative to the initial position so that:

$$d = b\sin\theta/2.$$

The elastic spring or springs 12 generate a return force upon the movable component 11 equal to $$K.d = Kb\sin\theta/2,$$

k being the stiffness constant of the spring.

This return force is transmitted by the straight portion 10 of the component 11 to one of the distal ends, B3 as shown in the drawing, of the transverse arms of the portion 2.

This force N is exerted at a distance h from the axis Bo such that:

$$h = b\cos\theta/2$$

The moment of this force N about the axis Bo, exerted upon the component 2, has the value:

$$Nh = Kb\sin\theta/2.b\cos\theta/2 = \tfrac{1}{2}Kb^2\sin\theta,$$

by application of the trigonometrical expression $$\sin\theta = 2\sin\theta/2.\cos\theta/2.$$

Owing to the fact that the velocity of rotation of the robot arm 1 is twice that of the component 2, the torque which is transmitted to the robot arm 1 from the component 2 by driving means M is divided by 2.

Thus the torque opposing the gravitational force on the arm 1 is equal to:

$$\tfrac{1}{2}(\tfrac{1}{2}Kb^2\sin\theta) = \tfrac{1}{4}Kb^2\sin\theta.$$

This torque will balance that generated by the gravitational force if the following equation is true:

$$PR\sin\theta = \tfrac{1}{4}Kb^2\sin\theta.$$

This equation is permanently satisfied by choosing the values of K and b such that:

$$\tfrac{1}{4}Kb^2 = PR.$$

The counter-balancing device according to the invention enables strictly correct balancing to be obtained with a large angular swing from $-150°$ to $+150°$ relative to the upward vertical. This device is of relatively simple construction and essentially uses elastic springs. It does not cause any significant dynamic interference phenomena.

I claim:

1. In a device for counter-balancing the gravity forces on a structure such as a robot arm hinged for rotation about a horizontal axis, the improvement wherein it incorporates:
    (a) a rigid auxiliary component hinged about a second horizontal axis parallel to said horizontal axis of the robot arm; (b) two transverse arms to said auxiliary component, said arms extending on each side of said second horizontal axis, these said two transverse arms having distal ends which are symmetrical relative to said second horizontal axis and forming a straight line which intersects said second horizontal axis; (c) a component having a straight portion against which said ends of the transverse arms bear; (d) means mounting said component for translational movement from an initial position; (e) means subjecting said translationally movable component to a return force towards said initial position, said force at any instantaneous position of said translationally movable component being proportional to the distance between said initial position and said instantaneous position of said translationally movable component, and (f) means for driving said rigid auxiliary component rotatably about the second horizontal axis at an angular velocity whose modulus is equal to half that of said robot arm;
    the assembly being calibrated angularly, such that (A) when the robot arm is vertical said two distal ends of the transverse arms bear simultaneously against the said straight portion of said translationally movable component which then occupies said initial position, said translationally movable component then not being subjected to any return force and (B) the constant of proportionality between said return force and the amplitude of the displacement of said movable component, and the distance from said second horizontal axis to the ends of the transverse arms being chosen in such a way that counter-balancing is achieved.

2. A device according to claim 1, wherein the constant of proportionality, and the distance from said second horizontal axis to said ends of the transverse arms are chosen such that the expression $\tfrac{1}{4}Kb^2 = PR$ is satisfied, where P represents the sum of the vertical gravity forces on the robot arm, and R represents the distance between the centre of action of the gravitational forces on the robot arm and the axis of rotation of the robot arm.

3. A device according to claim 1, wherein said translationally movable component is guided by a rectilinear translation mechanism along a direction which intersects said second horizontal axis and is at right angles to said second horizontal axis.

4. A device according to claim 1, wherein the direction of the translation ($\Delta$) of the translationally movable component is vertical.

5. A device according to claim 1, wherein said second horizontal axis is situated in the same vertical plane as the first mentioned axis of rotation, and is below said first mentioned axis.

6. A device according to claim 1, wherein said means for subjecting said translationally movable component to a return force includes spring means.

7. A device according to claim 2, wherein said means for subjecting the translationally movable component to a return force includes spring means having a stiffness constant K.

8. A device according to claim 1, wherein the distal ends of said transverse arms are each provided with a respective roller capable of rolling against said straight portion of said translationally movable component.

9. A device according to claim 1, wherein said means for driving said rigid auxiliary component rotatably at an angular velocity equal to half that of the robot arm includes; (i) a rotary slide member hinged at one end on said second horizontal axis of rotation of the rigid auxiliary component; (ii) articulation means on said robot arm engaging said rotary slide member at various optional points remote from said hinge; and (iii) a mechanism forming an isosceles triangle having one of its two equal sides joining said second horizontal axis of rotation to the first mentioned axis of rotation of the robot arm, and the other of its two equal sides joining the first mentioned axis of rotation of the robot arm to said articulation means of said rotary slide.

10. A device according to claim 1, wherein said translationally movable component is essentially in the shape of a T whose transverse branch defines said straight portion against which said distal ends of the transverse arms bear.

* * * * *